(12) United States Patent
Kobayashi

(10) Patent No.: US 9,898,727 B2
(45) Date of Patent: Feb. 20, 2018

(54) CREDIT CARD FRAUD PREVENTION SYSTEM

(75) Inventor: Yoshinori Kobayashi, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 949 days.

(21) Appl. No.: 13/498,833

(22) PCT Filed: Sep. 28, 2010

(86) PCT No.: PCT/JP2010/066812
§ 371 (c)(1),
(2), (4) Date: Jun. 7, 2012

(87) PCT Pub. No.: WO2011/040401
PCT Pub. Date: Apr. 7, 2011

(65) Prior Publication Data
US 2012/0246076 A1 Sep. 27, 2012

(30) Foreign Application Priority Data
Sep. 30, 2009 (JP) .................................. 2009-228579

(51) Int. Cl.
*G06Q 40/00* (2012.01)
*G06Q 20/32* (2012.01)
(Continued)

(52) U.S. Cl.
CPC ............. *G06Q 20/32* (2013.01); *G06Q 20/20* (2013.01); *G06Q 20/3224* (2013.01); *G06Q 20/4016* (2013.01)

(58) Field of Classification Search
CPC .... G06Q 20/20; G06Q 20/32; G06Q 20/3224; G06Q 20/4016
(Continued)

(56) References Cited

U.S. PATENT DOCUMENTS

| 7,669,759 B1 * | 3/2010 | Zettner | .................... 235/380 |
| 8,412,626 B2 * | 4/2013 | Hirson | .................... G06Q 20/32 |
| | | | 705/35 |

(Continued)

FOREIGN PATENT DOCUMENTS

| EP | 1286285 A1 | 2/2003 | |
| GB | 2383497 A * | 6/2003 | ............. G06Q 20/04 |

(Continued)

OTHER PUBLICATIONS

International Preliminary Report on Patentability dated May 18, 2012 for PCT/JP2010/066812.

(Continued)

*Primary Examiner* — Edward Baird
(74) *Attorney, Agent, or Firm* — Sughrue Mion, PLLC

(57) ABSTRACT

A server receives a card ID of a credit card, a credit amount, and a terminal ID for identifying a shop terminal from a shop terminal. The server acquires a corresponding user ID from the card ID, to find out whether this user has approved that location information can be acquired from his/her mobile terminal. In the case where the user has approved that location information is acquired in advance, the server acquires a mobile phone number from the user ID, to know a location of the mobile terminal with use of this mobile phone number. The server acquires a shop ID from the terminal ID (fixed-line telephone number) of the shop terminal, to be able to acquire a shop location from the shop ID. The server compares the location of the mobile terminal and the location of the shop, to judge whether or not conformance is made.

6 Claims, 4 Drawing Sheets

(51) Int. Cl.
*G06Q 20/20* (2012.01)
*G06Q 20/40* (2012.01)

(58) Field of Classification Search
USPC .................................................. 705/35–40
See application file for complete search history.

(56) References Cited

U.S. PATENT DOCUMENTS

| | | | |
|---|---|---|---|
| 2002/0052754 A1* | 5/2002 | Joyce ................... | G06Q 20/00 455/407 |
| 2002/0067291 A1 | 6/2002 | Ikeda | |
| 2006/0194592 A1* | 8/2006 | Clough ................. | G06Q 30/06 455/456.3 |
| 2007/0174082 A1 | 7/2007 | Singh | |
| 2007/0187491 A1* | 8/2007 | Godwin ................ | G06Q 20/12 235/380 |
| 2009/0132415 A1* | 5/2009 | Davis .................... | G06Q 20/10 705/43 |
| 2009/0171797 A1 | 7/2009 | Branca, Jr. | |
| 2009/0187492 A1* | 7/2009 | Hammad et al. ............... 705/26 | |
| 2009/0254476 A1* | 10/2009 | Sharma ................. | G06Q 20/10 705/39 |
| 2009/0307141 A1* | 12/2009 | Kongalath ............ | G06Q 20/32 705/72 |
| 2010/0059587 A1* | 3/2010 | Miller ................ | G06Q 20/1085 235/379 |

FOREIGN PATENT DOCUMENTS

| | | | |
|---|---|---|---|
| JP | 2002024885 A | 1/2002 | |
| JP | 2003-099690 A | 4/2003 | |
| JP | 2005-275459 A | 10/2005 | |
| JP | 2006004337 A | 1/2006 | |
| JP | 2006-085446 A | 3/2006 | |
| JP | 2006-338414 A | 12/2006 | |
| JP | 2007-026397 A | 2/2007 | |
| WO | 01/88790 A1 | 11/2001 | |
| WO | WO 03067506 A2 * | 8/2003 | ............ G06Q 20/04 |
| WO | 2009/094433 A1 | 7/2009 | |

OTHER PUBLICATIONS

Japanese Patent Office Action dated May 15, 2012 for Japanese Patent Application No. P2011-534246.

* cited by examiner

Fig.2

(a) CARD INFORMATION (CARD DB)

| CARD NUMBER |
| --- |
| EXPIRATION DATE |
| AMOUNT LIMIT |
| AMOUNT OF AVAILABLE CREDIT |
| THEFT-LOSS FLAG |
| USER ID |
| ⋮ |

(b) USER INFORMATION (USER DB)

| USER ID |
| --- |
| CARD NUMBER |
| MOBILE PHONE NUMBER |
| E-MAIL ADDRESS (FOR MOBILE TERMINAL) |
| LOCATION INFORMATION PROVISION APPROVAL FLAG |
| LOCATION INFORMATION (LATITUDE AND LONGITUDE) |
| LOCATION INFORMATION (BASE STATION AREA) |
| GPS OR BASE STATION AREA |
| LOCATION INFORMATION RECEIPT FLAG |
| REGISTERED LOCATION INFORMATION (LATITUDE AND LONGITUDE) |
| RECEIPT TIME INFORMATION |
| RESIDENCE INFORMATION (LATITUDE AND LONGITUDE) |
| ⋮ |

(c-1) SHOP INFORMATION (SHOP DB)

| SHOP ID |
| --- |
| NAME |
| STREET ADDRESS INFORMATION (LATITUDE AND LONGITUDE) |
| SHOP TERMINAL ID (l) |
| ⋮ |
| SHOP TERMINAL ID (N) |
| ⋮ |

(c-2) SHOP TERMINAL INFORMATION (SHOP DB)

| SHOP TERMINAL ID (FIXED-LINE TELEPHONE NUMBER) |
| --- |
| SHOP ID |
| STREET ADDRESS INFORMATION (LATITUDE AND LONGITUDE) |
| STREET ADDRESS INFORMATION (AREAS OR FLOORS INSIDE BUILDING) |
| ⋮ |

CREDIT CARD FRAUD PREVENTION SYSTEM

CROSS REFERENCE TO RELATED APPLICATIONS

This application is a National Stage of International Application No. PCT/JP2010/066812 filed Sep. 28, 2010, claiming priority based Japanese Patent Application Nos. 2009-228579, filed Sep. 30, 2009 the contents of all of which are incorporated herein by reference in their entirety.

TECHNICAL FIELD

The present invention relates to inquiry processing for credit confirmation of a credit card, and in particular, to processing for preventing use by someone other than the person himself.

BACKGROUND ART

Conventionally, in inquiry processing for credit confirmation at the time of using a credit card, credit has been approved on the basis of a credit limit/use expense of a user, the restriction of use declared by the user, the presence or absence of registration on a blacklist, and the like.

In order to perform credit confirmation on the basis of user information (for example, information on theft-loss, or the like) other than financial information such as use expenses, it is necessary for a user to voluntarily declare the user information other than the financial information, thereby causing a time lag in reflection to the credit information, which results in low security for fraudulent use such as credit card theft. Further, in most cases, users are not aware that their credit cards are subjected to skimming, and therefore, it is not expected that users report fraudulent use, which makes it difficult to respond to the cases.

Therefore, conventionally, in response to a fraudulent use such as credit card theft, skimming, and the like, it has been proposed that a credit card usable area or the like is registered in advance (refer to Patent Literature 1 and 3), contact with a user is made by e-mail for each use (refer to Patent Literature 2), or the like.

However, a determination of fraudulent use based on information such as a credit card usable area registered in advance places restrictions on usage of a credit card by the person himself, that is inconvenient. Further, with a notification of usage by e-mail as well, it is impossible to detect a fraudulent use at the time of usage of the credit card, that results in post-management.

CITATION LIST

Patent Literature

Patent Literature 1: Japanese Patent Application Laid-Open No. 2007-26397
Patent Literature 2: Japanese Patent Application Laid-Open No. 2006-85446
Patent Literature 3: Japanese Patent Application Laid-Open No. 2005-275459

SUMMARY OF INVENTION

Technical Problem

An object to be solved by the present invention is to provide a system that prevents a fraudulent use such as spoofing when the user utilizes the credit card, to a credit card user.

Solution to Problem

In order to solve the above described problems, the present invention provides a server of a credit processing system which has a card information storing means for storing information on a credit card, a user information storing means for storing information on a user of the credit card, and a shop information storing means for storing information on a shop where the credit card can be used, the server of the credit processing system including a credit inquiry receiving means for receiving a credit inquiry including a card ID and a credit amount from a shop terminal, a mobile terminal location information acquiring means for acquiring identification information of a mobile terminal of the user who uses the credit card from the user information storing means, to acquire location information of the mobile terminal corresponding to the identification information, a shop location information acquiring means for acquiring location information of the shop where the credit card is used from the shop information storing means, a fraudulent use judging means for comparing the acquired location information of the mobile terminal and the acquired location information of the shop, to judge whether or not conformance is made with a predetermined condition, and a credit processing means for performing credit processing in a case where conformance is made with the predetermined condition. In addition, the identification information of the mobile terminal is information such as a mobile phone number, a terminal identification number, and an e-mail address, that is for identifying the mobile terminal owned by the user who uses the credit card.

Moreover, the predetermined condition of the fraudulent use judging means preferably differs in conformance range depending on a case where the location information of the mobile terminal is acquired by a GPS function and a case of area information of a base station in which the mobile terminal resides.

The server of the credit processing system further including mobile terminal location information receiving means for receiving location information of the mobile terminal of the user who uses the credit card, and location information registering means for registering the location information from the mobile terminal location information receiving means and a receipt time of receiving the location information with the user information storing means, and when receiving the credit inquiry from the credit inquiry receiving means, the fraudulent use judging means may judge whether or not conformance is made with the predetermined condition on the basis of the registered location information in a case where the receipt time registered in the user information storing means is within a given range.

When receiving the credit inquiry from the credit inquiry receiving means, the fraudulent use judging means may judge whether or not conformance is made with the predetermined condition on the basis of the location information acquired by the mobile terminal location information acquiring means in a case where the receipt time registered in the user information storing means is out of the given range and in a case where the location information is not registered in the user information storing means.

Further, a method of executing these in a server, a program causing the server to execute the method, and a computer-readable recording medium recording the program are included in the present invention.

Advantageous Effects of Invention

As described above, in the present invention, because identity verification is performed with use of location information of a mobile terminal, it is possible to prevent a fraudulent use such as skimming or a use of a stolen credit card by a person other than the person himself.

BRIEF DESCRIPTION OF DRAWINGS

FIG. 2 are diagrams showing database configurations.

DESCRIPTION OF EMBODIMENTS

[Subject-Matter of the Invention]

A credit card company manages information on street addresses of shops and the like where credit cards are usable. Further, in authorization performed at the time of utilizing a credit card, information on a user who utilizes the card and a shop where the credit card is utilized are processed. Therefore, it is possible for the credit card company to understand a street address of the shop where the credit card is utilized at the point in time of receiving the inquiry of credit availability/unavailability from the shop.

Further, nowadays, it is not much of a stretch of the imagination to consider that every single person owns a mobile phone, and in addition, mobile phones are always on hand. Then, mobile phones are capable of notifying information on present locations with a GPS function along with a mobile phone or through a base station or the like within a range available for communication. That is, it is possible to know a present location of a user owning a mobile phone.

The present invention is to prevent a fraudulent use of a credit card by inquiring about a street address of a shop or the like when a credit card is utilized and a location of a mobile phone owned by a user in consideration of the aforementioned circumstances.

The present invention will be described in detail according to the following embodiments.

Embodiments

1. Outline of System

An outline of a credit processing system of the present embodiment will be described with reference to FIGS. 1 and 2.

The system of the present embodiment is a system that performs credit processing with respect to a credit card user.

1-1. Hardware Configuration

Figure 1:
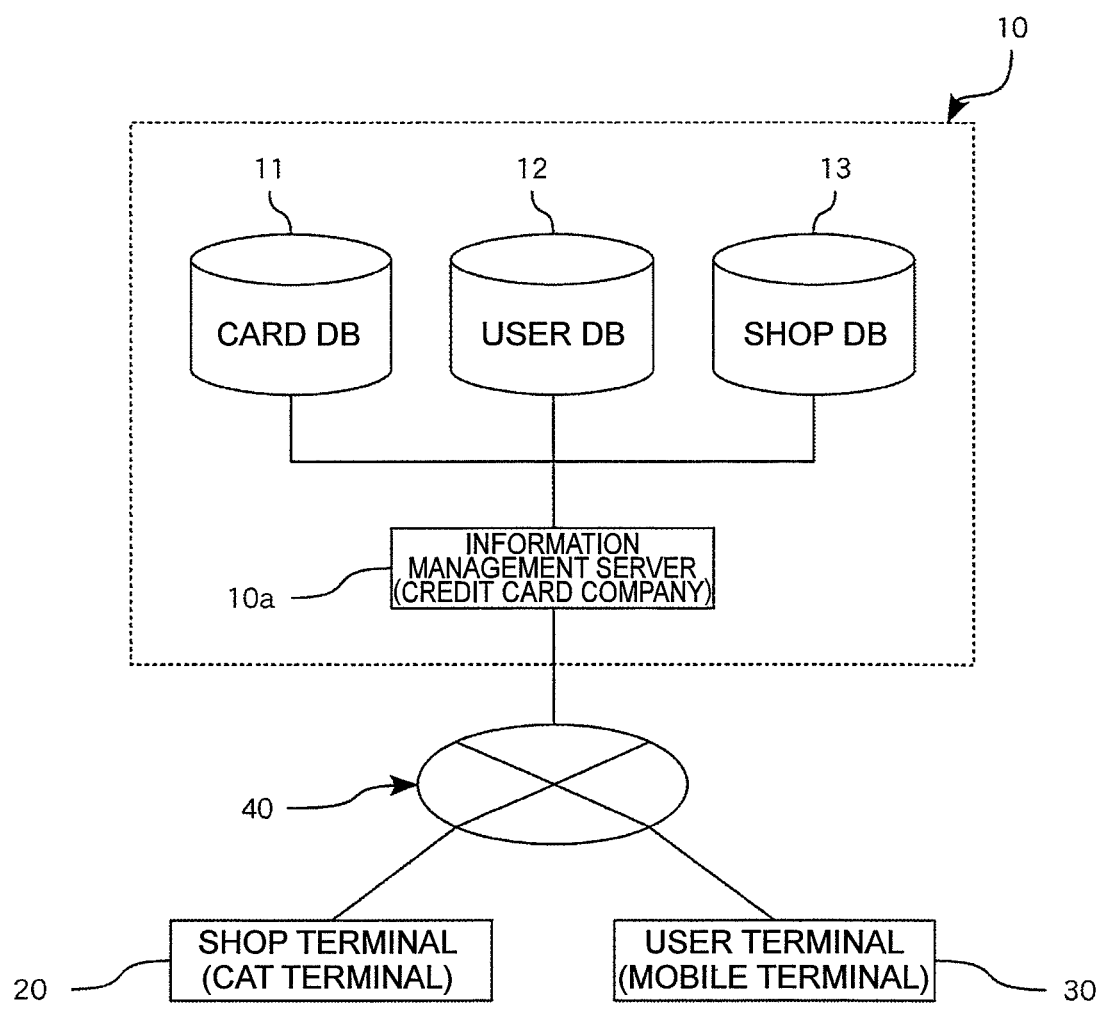
FIG. 1 is a block diagram showing a hardware configuration.

As shown in FIG. 1, a credit processing system 10 of the present embodiment is, as a whole, composed of an information management server 10*a*, a shop terminal 20, and a user terminal 30.

The information management server 10*a* has a card DB 11, a user DB 12, and a shop DB 13.

The information management server 10*a* can be connected to the shop terminal 20 and the user terminal 30 via a communication network 40.

In addition, the communication network 40 is built up by, for example, the Internet, a leased communication line (for example, CATV (Community Antenna Television) line), a fixed communication network, a mobile communication network (including a base station or the like), a gateway, and the like.

[(1) Information Management Server]

In FIG. 1, the information management server 10*a* is a server, which is installed by a credit card company, and manages information related to credit cards. The information management server 10*a* appropriately uses information stored in, for example, the DB 11, the DB 12, and the DB 13, to perform processing relating to credit approval (processing of receiving inquiry information on credit availability/unavailability from the shop terminal 20, to make a reply of credit availability/unavailability to the shop terminal 20), and processing relating to a sales bill.

[(2) Database]

In FIG. 1, the DBs 11 to 13 are databases respectively composing database management systems (DBMS). The DBs 11 to 13, for example, read out information satisfying the condition to provide those in response to requests from the information management server 10*a*.

In the present embodiment, the DBs 11 to 13 are respectively built up as external storage devices connected to the information management server 10*a*. In addition, as long as it is possible to read out the stored information, the DBs 11 to 13 may be built up as a storage device built-in the information management server 10*a*.

[(3) Shop Terminal]

In FIG. 1, the shop terminal 20 is a CAT terminal (Credit Authorization Terminal) installed in a shop. The shop terminal 20 has a function that, for example, when a shop clerk of the shop inputs an amount, and carries out a predetermined operation such as insertion of a credit card (of a magnet stripe type), the shop terminal 20 performs communication with the information management server 10*a* to inquire about credit availability/unavailability.

As long as the shop terminal 20 has a similar function, the shop terminal 20 may be integrated with a register (cash register).

In addition, the credit card may be a credit card with a built-in IC chip, for example. Further, the credit card may not be limited to a card-type one, and may be one utilizing an IC chip built-in a mobile phone, for example (a so-called mobile credit).

In these cases, in place of its card number, an identification number of an IC chip is stored as an item of card information in the card DB 11. Further, the shop terminal 20 reads the identification information of the IC chip, and transmits the inquiry information including the identification information of the IC chip in place of a "card number" to the information management server 10*a*.

[(4) User Terminal]

In FIG. 1, the user terminal 30 is a mobile terminal which a user has (for example, a mobile phone, a smartphone, a PDA, or the like).

This user terminal (mobile terminal) 30 is preferably equipped with a GPS function. Then, the user carries out a simple operation to be able to acquire a present location from the GPS function. Moreover, when an inquiry about a location is sent to this mobile phone number, a present location is acquired from the GPS function under the approval of the user or the pre-approval to be able to reply to the inquiry.

Further, in the case where the user terminal 30 is not equipped with a GPS function, the user terminal 30 is capable of making a reply of area information (an area number or the like) of a base station in which the user terminal 30 resides, to an inquiry origin.

In addition, a request to acquire location information of the user terminal 30 and acquired location information may be transmitted via a communication channel or an e-mail.

1-2. Database Configurations

[(1) Card DB]

In FIG. 1, the card DB 11 is a database for storing information related to credit cards. In the present embodiment, each of a plurality of card information is stored in the card DB 11.

Card information is each created on the basis of an agreement between a user and a credit card company, for example, and is changed as needed.

Otherwise, information related to processing for approval of credit and information related to processing for a sales bill are stored in the card DB 11.

FIG. 2(*a*) shows main items of card information.

As shown in FIG. 2(*a*), card information as one record includes at least a "card number," an "expiration date," a "amount limit," an "amount of available credit," a "theft-loss flag," and a "user ID."

Here, the "amount limit" is a credit limit per month. The "amount of available credit" is a remaining amount of an available credit line for this month. The "theft-loss flag" is a flag indicating a state of temporary suspension of use of the credit card. Otherwise, information on each user may be stored as the card information.

[(2) User DB]

In FIG. 1, the user DB 12 is a database for storing information related to users so as to allow overlapping with the card DB on the basis of "user ID." In the present embodiment, a plurality of user information is stored in the user DB 12.

The user information is provided for performing various services to users owning credit cards, for example, and is created on the basis of applications for registrations of services. In addition, some of the items of the user information may be periodically synchronized with the card information (FIG. 2(*a*)) to be appropriately changed. Further, such information may be stored according to the card numbers of the card DB.

FIG. 2(*b*) shows main items of user information.

As shown in FIG. 2(*b*), user information as one record includes a "user ID," a "card number," a "mobile phone number," an "e-mail address," a "location information provision approval flag," and "location information" or the like.

Here, the "e-mail address" is an e-mail address for the user terminal 30 (mobile terminal). The "location information provision approval flag" is a flag indicating that the user has approved provision of location information in advance. This is required to acquire the approval from the user according to the agreement when creating the credit card, for example. The "location information" is information corresponding to a present location of the user, and the location information is indicated at its longitude and latitude, for example, to be stored in the present embodiment. Moreover, a "GPS or base station area" for identifying whether the stored location information is acquired by the GPS function of the user terminal 30 or area information of the base station in which the user terminal 30 resides, a "location information receipt flag" indicating whether the location information transmitted by utilizing the GPS function of the user terminal 30 from the user is received, "registered location information" that is the received location information, "receipt time information" indicating a time of receiving the location information, and the like are stored.

In addition, the above-described "e-mail address" included in the user information may not be only an e-mail address of the user terminal 30, but also an e-mail address available for a personal computer or the like. In the latter case, for example, it is necessary for each user to set such that e-mails to the e-mail address are forwarded to an e-mail address of the user terminal 30 in real time or to be able to check e-mails to the e-mail address available for a personal computer or the like in real time on the user terminal 30.

[(3) Shop DB]

In FIG. 1, the shop DB 13 is a database for storing information related to shops where credit cards are usable. In the present embodiment, a plurality of shop information is stored in the shop DB 13.

Shop information is each created on the basis of an agreement between a shop and a credit card company, and is changed as needed.

FIG. 2(*c*-1) shows main items as shop information.

As shown in FIG. 2(*c*-1), shop information as one record includes a "shop ID," a "name," "street address information," and a "shop terminal ID."

Here, the "name" is a character string for ease of determination of the shop, and is a shop legal name (business name/trade name, or the like) or its abbreviated name or the like. The "street address information" is information corresponding to a street address of the shop, and in the present embodiment, the latitude and longitude corresponding to the street address of the shop are stored. The "shop terminal ID" is identification information on a shop terminal installed in the shop. In the case where respective shop terminals are respectively connected to different fixed-line telephone lines, their fixed-line telephone numbers may be used.

Moreover, as shown in FIG. 2(*c*-2), street address information may be set for each shop terminal. The aforementioned street address information is not only the latitude and longitude corresponding to the street address of the shop terminals, but also information related to areas or floors (floor levels) inside a building in which the respective shop terminals reside.

In addition, the information stored in each DB described above is an example, and information to be stored in each DB or the method of organizing the information may be appropriately changed.

2. Credit Processing

Credit processing executed in the information management server 10*a* of the credit processing system 10 of the present embodiment will be described by flowcharts shown in FIGS. 3 and 4.

As described above, the present invention is to prevent a fraudulent use of a credit card by inquiring about a street address of a shop or the like when a credit card is utilized and a location of a mobile phone held by a user.

Figure 3:
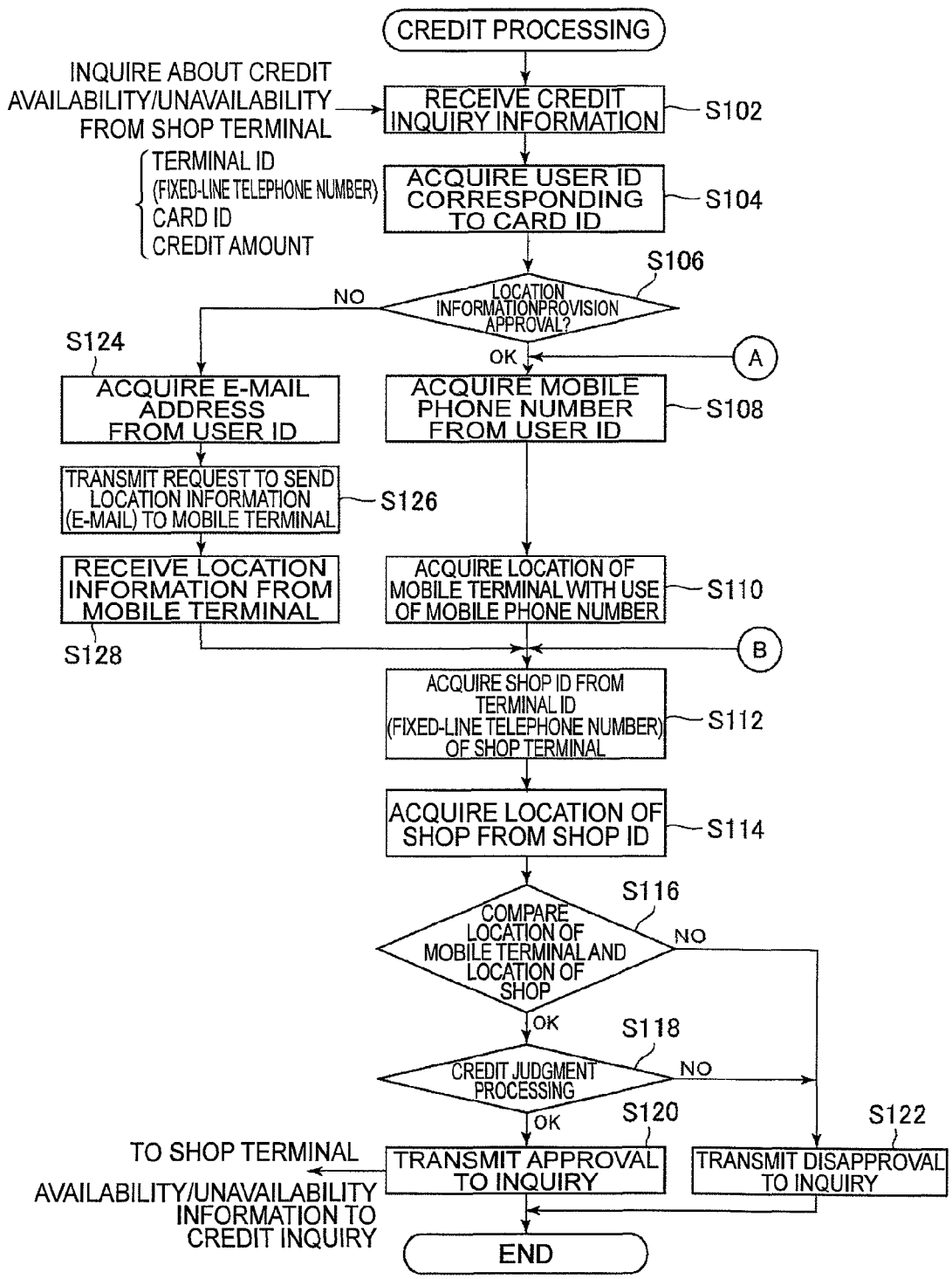
FIG. 3 is a diagram showing a flowchart for describing credit processing of an embodiment in a server.

The flowchart shown in FIG. 3 shows a first embodiment in which the server 10*a* acquires a location of a mobile phone held by a user when the user uses the credit card, to use it for credit processing.

Figure 4:
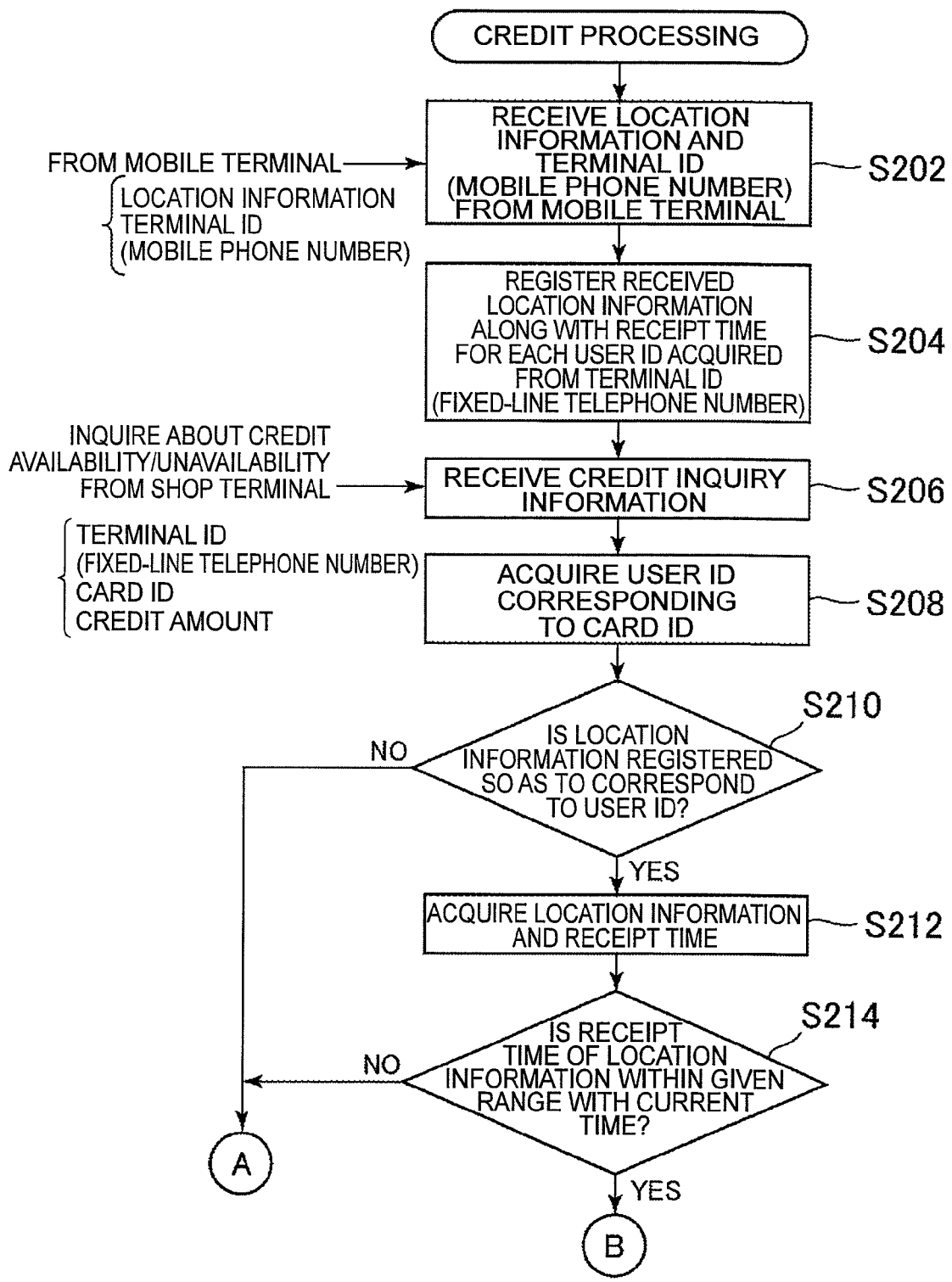
FIG. 4 is a diagram showing a flowchart for describing credit processing of another embodiment in the server.

The flowchart shown in FIG. 4 shows a second embodiment in which a user transmits a location of a mobile phone owned by the user to the server 10a in advance, to use it for credit processing.

2-1. First Embodiment

The first embodiment in which the server 10a acquires a location of a mobile phone owned by a user when the user uses a credit card, to use it for credit processing will be described in detail with use of the flowchart shown in FIG. 3.

Credit processing starts when a user gives a credit card to a shop clerk, and the shop clerk receiving the credit card causes a shop terminal (CAT terminal) 20 (refer to FIG. 1) to read information on the credit card, and inputs a credit amount thereto. The shop terminal 20 transmits a terminal ID for identifying the shop terminal to the server 10a along with a card ID of the credit card and the credit amount, to inquire about the credit availability/unavailability. In the case where the shop terminal 20 is connected to the server 10a via a fixed-line telephone line network, its fixed-line telephone number may be used as a terminal ID.

The server 10a receives the card ID of the credit card, the credit amount, and the terminal ID for identifying the shop terminal (S102), to start the credit processing. Then, the server 10a acquires a corresponding user ID from the card ID (S104; FIGS. 2(a) and 2(b)), to find out whether this user has approved that location information can be acquired from his/her mobile terminal with a "location information provision approval flag" (S106; FIG. 2(b)).

In the case where the user has approved that location information can be acquired in advance (OK at S106), the server 10a acquires a mobile phone number of the user from the user ID (S108; FIG. 2(b)), to know a location of the mobile terminal with use of this mobile phone number (S110).

In the case where the user has not approved that location information can be acquired (NO at S106), the server 10a acquires an e-mail address of the user from the user ID (S124; FIG. 2(b)), and transmits a request to send location information to the mobile terminal with use of this e-mail address (S126), to know a location of the mobile terminal on the basis of a notification from the mobile terminal corresponding to the request to send (S128).

In addition, respective mobile phone companies provide services for searching locations of mobile terminals from mobile phone numbers. With the services provided by the respective mobile phone companies, a location measured by the GPS function is provided when a mobile phone is equipped with a GPS function, and area information of a base station in which the mobile phone resides is provided when a mobile phone is not equipped with a GPS function. This discrimination as well is received to be stored (refer to FIG. 2(b) "GPS or base station area").

Next, the server 10a acquires a shop ID from the terminal ID (fixed-line telephone number) of the shop terminal (S112; FIG. 2(c-1)), to be able to acquire a shop location from the shop ID (S114; FIG. 2(c-1)).

Then, the server 10a compares the location of the mobile terminal and the location of the shop, to judge whether or not conformance is made with a predetermined condition (S116).

In the case where area information on a base station is used as the predetermined condition, the area information on the base station has a wide range of several hundred meters to several kilometers (in the case of "macrocell"), and in the case where a location by the GPS function is used as well, errors from several tens of meters to several hundred meters are caused in location information on a mobile terminal to be measured depending on the number of satellites which are available at the time of measuring location information by the GPS function. Thus, these are required to be considered. In addition, since a user having the user terminal (mobile terminal) 30 using a credit card is indoors in many cases, it may be considered that there are not a large number of satellites which are available for location measurement.

Accordingly, the following conditions may be conceived of.

(1) Under the condition of within the area in the case where location information of a mobile terminal is area information on a base station, and under the condition of several hundred meters (for example, 200 meters) in the case where location information (longitude and latitude) is acquired by GPS, it is judged as OK when a shop location is within the range, and it is judged as NO in other cases.

In this way, provided that conformance ranges differ in the case where location information of a mobile terminal is acquired by a GPS function, and in the case where there is area information of a base station in which a mobile terminal resides, it is possible to accurately prevent a fraudulent use.

In addition, in the case of comparing locations within a range of several hundred meters, when a large number of shop terminals are installed inside a shop which is composed of a wide single floor level or a shop which is composed of a plurality of floor levels, it is necessary to store location information for each of the shop terminals (refer to FIG. 2(c-2)), and to acquire the location to use it.

(2) Without discrimination between methods of acquiring a location of a mobile terminal, it is judged as OK when location information of a mobile terminal is included, or when at least a part of area information on a base station in which the mobile terminal resides is included within a range of several kilometers (for example, 2 kilometers) from the shop location, and it is judged as NO in other cases. In this way, its conformance is judged according to a sufficiently wide and single range.

This is because it may be considered that it is possible to sufficiently prevent a fraudulent use only by a user using a credit card is near a location of a shop (within several kilometers).

In the case where it is judged that it conforms to the predetermined condition (OK at S116), the server 10a makes a normal credit judgment (S118), thereby sending a reply (availability/unavailability information) to the credit inquiry to the shop terminal (S120 or S122).

In the credit processing of the first embodiment, because a location of a user (location of a mobile terminal) at the time of using a credit card is usable, it is expected that it is possible to effectively detect a fraudulent use of a stolen credit card or the like.

2-2. Second Embodiment

The second embodiment in which a user acquires a location by a GPS function of a mobile phone held by the user and transmits it to the server 10a in advance, to use the location for credit processing will be described in detail with the flowchart shown in FIG. 4.

With this, provided that accurate location information is acquired, for example, outdoors where many satellites can be used, to use the location information for identity verification, it is possible to prevent a fraudulent use. Further, for example, in the case where shopping is done several times at various shops in a large shopping center, accurate location information is acquired once, and it is possible to utilize the location information for identity verification of the shopping utilizing his/her credit card in the shopping center.

In credit processing of the second embodiment, first, a user acquires a location with use of a GPS function of the mobile terminal 30, and transmits it to the information management server 10*a* of the credit processing system 10. The server 10*a* receives it along with a mobile phone number (S202), and acquires a user ID from the mobile phone number (terminal ID), to register the location information along with its receipt time for each user ID (S204: FIG. 2(*b*) "Registered location information," "Receipt time information." The information is used as information for identity verification in the following processing.

In addition, the registered location information and receipt time may be deleted when the date is changed, for example.

Then, the server 10*a* receives a card ID of the credit card, a credit amount, and a terminal ID (fixed-line telephone number) for identifying the shop terminal (S206), to start the credit processing.

Then, the server 10*a* acquires a corresponding user ID from the card ID (S208; FIGS. 2(*a*) and 2(*b*)), to find out whether location information of this user is registered from his/her mobile terminal with a "location information receipt flag" (S210; FIG. 2(*b*)). In the case where the location information is registered, the location information and its receipt time are acquired (S212; FIG. 2(*b*) "Registered location information," "Receipt time information").

The server 10*a* compares the receipt time and a current time, to find out whether it is within a given range (for example, within four hours) (S214). This time is a period of validity for the location information, and is, for example, a time corresponding to a shopping time at one place (for example, one shopping center).

In the case where the time is within the given range (YES at S214), the server 10*a* acquires a shop ID from the terminal ID (S112) and a shop location from the shop ID (S114) in the flowchart of FIG. 3, and compares the location of the mobile terminal and the location of the shop, to judge whether or not conformance is made with a predetermined condition (S116). In addition, in this case, the location of the mobile terminal to be used is a location which is transmitted in advance from a user to be acquired from the GPS function. Further, this applicable condition for identifying the person himself is a range which is capable of sufficiently covering a wide shopping center, for example. Thereafter, the server 10*a* performs credit processing which is the same as that in the above-described first embodiment.

In the case where location information of the mobile terminal is not transmitted from the user (NO at S210), or in the case where the time is out of the given range (NO at S214), the server 10*a* acquires a mobile phone number of the user from the user ID (S108), to acquire a location of the mobile terminal with use of this mobile phone number (S110) in the flowchart of FIG. 3, Thereafter, the server 10*a* performs processing which is the same as that in the above-described first embodiment.

In addition, the period of validity for the location information described above may be allowed to be set by the user. Further, when the server 10*a* receives predetermined information from the user terminal 30, the location information may be rendered invalid immediately.

2-3. Third Embodiment

In the second embodiment described above, in the case where location information of the mobile terminal is not transmitted from the user (NO at S210), or in the case where the time is out of the given range (NO at S214), the server 10*a* performs processing of acquiring a location of a mobile terminal in the same way as in the first embodiment.

However, it may be configured such that a user acquires a location of a mobile phone held by the user with a GPS function, and transmits it to the server 10*a* to register it in advance, and the server 10*a* performs identity verification with only the registered location information. This is the third embodiment.

In the third embodiment, in the case where location information of a mobile terminal is not transmitted from a user (NO at S210), or in the case where a time is out of a given range (NO at S214), the server 10*a* makes a reply of unavailability to the credit inquiry.

In the third embodiment, a user acquires location information of a mobile phone with a GPS function, and transmits it to the server 10*a* to register it in advance, and the server 10*a* performs identity verification with only the registered location information.

In addition, in the above-described embodiment, as location information of a mobile terminal compared with location information of a shop, location information (information indicating the latitude and longitude) by GPS and area information of the base station in which the user terminal 30 resides (is in its service area) are used. However, otherwise, information indicating a country or a region at which a user of the user terminal 30 is located (country/region information) may be used. For example, a user of the user terminal 30 registers country/region information with the information management server 10*a* in advance of utilizing a credit card, and the registered country/region information is utilized at the time of credit processing.

Alternatively, as country/region information, information indicating a communication carrier in global roaming may be used. In that case, the user terminal 30 acquires information indicating the communication carrier from a mobile communication network within the user terminal 30 is in its service area at the time of roaming, and transmits the information to the information management server 10*a* in advance of utilizing the credit card.

Further, even in the case where a country where a user utilizes a credit card is a country (for example, Netherlands) other than a country (for example, Japan) where the credit processing system 10 is provided, credit processing is performed in the country where the credit processing system 10 is provided, that corresponds to the action of the embodiment of the present invention in the country (in the above-described case, Japan) where the credit processing system 10 is provided.

Continuously, a program for causing a computer to execute a series of the above-described processing of the information management server 10*a* of the credit processing system 10 will be described. The program is stored within a program storage region formed in a recording medium included in a computer or inserted into a computer to be accessed by a computer.

The program includes modules corresponding to the function of the information management server 10*a* of the credit processing system 10 described above, and those modules are executed to realize the above-described function. In addition, it may be configured such that a part of or all the program is transmitted via a transmission medium such as a communication line, to be received by another device to be recorded (including installation). Further, the respective modules in the program may be installed in, not one computer, but in any one of a plurality of computers. In that case, the series of processing is performed by a computer system composed of the plurality of computers.

REFERENCE SIGNS LIST

10 . . . Credit processing system
10a . . . Information management server
11 . . . Card DB
12 . . . User DB
13 . . . Shop DB
20 . . . Shop terminal (CAT terminal)
30 . . . User terminal (Mobile terminal)
40 . . . Communication network

The invention claimed is:

1. A credit processing server comprising:
  at least one memory operable to store information on a credit card, information on a user of the credit card, information on a shop where the credit card is usable, and program code;
  at least one processor operable to access said memory and read said program code and operate as instructed by said program code, said program code including:
  credit inquiry receiving code configured to cause the at least one processor to receive a credit inquiry including a card ID and a credit amount from a shop terminal;
  mobile terminal identification information acquiring code configured to cause the at least one processor to acquire identification information of a mobile terminal of the user who uses the credit card;
  mobile terminal location information acquiring code configured to cause the at least one processor to acquire GPS location information of the mobile terminal using a GPS function of the mobile terminal or acquire area information from a base station in which the mobile terminal resides, as location information of the mobile terminal corresponding to the identification information;
  determining code configured to cause the at least one processor to determine whether the acquired location information of the mobile terminal is the GPS location information or the area information of the base station;
  shop location information acquiring code configured to cause the at least one processor to acquire location information of the shop where the credit card is used;
  fraudulent use judging code configured to cause the at least one processor to compare the acquired location information of the mobile terminal and the acquired location information of the shop, and judge whether or not conformance is made with a predetermined condition; and
  credit processing code configured to cause the at least one processor to perform credit processing in a case where conformance is made with the predetermined condition,
  wherein the predetermined condition of the fraudulent use judging code comprises a first conformance range and a second conformance range, and
  wherein the fraudulent use judging code is further configured to cause the at least one processor to judge whether or not the conformance is made with the predetermined condition based on the first conformance range when the location information of the mobile terminal is acquired by the GPS function and
  the fraudulent use judging code is further configured to cause the at least one processor to judge whether or not the conformance is made with the predetermined condition based on the second conformance range when the location information corresponds to the area information of the base station in which the mobile terminal resides, the first conformance range being different from the second conformance range.

2. The credit processing server according to claim 1, wherein the program code further comprising:
  mobile terminal location information receiving code configured to cause the at least one processor to receive location information of the mobile terminal of the user who uses the credit card; and
  location information registering code configured to cause the at least one processor to register the location information along with a receipt time of receiving the location information, wherein
  when receiving the credit inquiry, the fraudulent use judging code is further configured to cause the at least one processor to judge whether or not conformance is made with the predetermined condition based on the registered location information when the receipt time is within a predetermined period from a current time.

3. The credit processing server according to claim 2, wherein
  when receiving the credit inquiry, the fraudulent use judging code is further configured to cause the at least one processor to judge whether or not conformance is made with the predetermined condition on the basis of the location information when the receipt time is out of the predetermined period and when the location information is not registered.

4. The credit processing server according to claim 1, wherein the determining code is further configured to cause the at least one processor to determine, when the location information of the mobile terminal is acquired by the GPS function, that the condition is conformed to, if the location of the shop exists within a specific distance range from the location of the mobile terminal, and
  determine, when the location information of the mobile terminal corresponds to the area information of the base station in which the mobile terminal resides, that the condition is conformed to, if the location of the shop exists within an area relating to the location information of the mobile terminal.

5. A method which is executed by a server of a credit processing system comprising at least one processor, a card information storage for storing information on a credit card, user information storage for storing information on a user of the credit card, and shop information storage for storing information on a shop where the credit card is usable, the method comprising:
  receiving, using at least one of said at least one processor, a credit inquiry including a card ID and a credit amount from a shop terminal;
  acquiring, using at least one of said at least one processor, identification information of a mobile terminal of the user who uses the credit card;
  acquiring GPS location information of the mobile terminal using a GPS function of the mobile terminal or acquiring area information from a base station in which the mobile terminal resides, as location information of the mobile terminal corresponding to the identification information;
  determining, using at least one of said at least one processor, whether the acquired location information of the mobile terminal is the GPS location information or the area information of the base station;

acquiring, using at least one of said at least one processor, location information of the shop where the credit card is used;

comparing, using at least one of said at least one processor, the acquired location information of the mobile terminal and the acquired location information of the shop, judging whether or not conformance is made with a predetermined condition; and performing, using at least one of said at least one processor, credit processing in a case where conformance is made with the predetermined condition, wherein the predetermined condition comprises a first conformance range and a second conformance range, and wherein the operation of judging whether or not the conformance is made with the predetermined condition based on the first conformance range when the location information of the mobile terminal is acquired by the GPS function and wherein the operation of judging whether or not the conformance is made with the predetermined condition based on the second conformance range when the location information corresponds to the area information of the base station in which the mobile terminal resides, the first conformance range being different from the second conformance range.

6. A non-transitory computer readable recording medium recording a program of a server of a credit processing system which has a card information storage for storing information on a credit card, user information storage for storing information on a user of the credit card, and shop information storage for storing information on a shop where the credit card is usable, the program causes the server to execute a method comprising:

receiving a credit inquiry including a card ID and a credit amount from a shop terminal;

acquiring identification information of a mobile terminal of the user who uses the credit card;

acquiring GPS location information of the mobile terminal using a GPS function of the mobile terminal or acquiring area information from a base station in which the mobile terminal resides, as location information of the mobile terminal corresponding to the identification information;

determining whether the acquired location information of the mobile terminal is the GPS location information or the area information of the base station;

acquiring location information of the shop where the credit card is used;

comparing the acquired location information of the mobile terminal and the acquired location information of the shop, judging whether or not conformance is made with a predetermined condition; and performing credit processing in a case where conformance is made with the predetermined condition, wherein the predetermined condition comprises a first conformance range and a second conformance range, and wherein the operation of judging whether or not the conformance is made with the predetermined condition based on the first conformance range when the location information of the mobile terminal is acquired by the GPS function, and wherein the operation of judging whether or not the conformance is made with the predetermined condition based on the second conformance range when the location information corresponds to the area information of the base station in which the mobile terminal resides, the first conformance range being different from the second conformance range.

* * * * *